United States Patent
Wu et al.

(10) Patent No.: US 12,000,654 B2
(45) Date of Patent: Jun. 4, 2024

(54) CONVEYOR AND BAKING DEVICE

(71) Applicant: CONTEMPORARY AMPEREX TECHNOLOGY CO., LIMITED, Fujian (CN)

(72) Inventors: Zhiyang Wu, Fujian (CN); Peng Jin, Fujian (CN); Lijun Li, Fujian (CN); Chaonan Liu, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/231,796

(22) Filed: Aug. 9, 2023

(65) Prior Publication Data

US 2023/0384034 A1 Nov. 30, 2023

Related U.S. Application Data

(63) Continuation of application No. PCT/CN2022/131126, filed on Nov. 10, 2022.

(30) Foreign Application Priority Data

Feb. 28, 2022 (CN) .......................... 202220424505.0

(51) Int. Cl.
*F27B 9/24* (2006.01)
*B65G 15/10* (2006.01)
*B65G 17/00* (2006.01)

(52) U.S. Cl.
CPC ............ *F27B 9/243* (2013.01); *B65G 15/105* (2013.01); *B65G 17/00* (2013.01)

(58) Field of Classification Search
USPC ....................................................... 104/180
See application file for complete search history.

(56) References Cited

U.S. PATENT DOCUMENTS

| | | | | |
|---|---|---|---|---|
| 142,003 A | * | 8/1873 | Crumbie ................. | A21B 1/46 403/291 |
| 467,289 A | * | 1/1892 | Mount .................. | B65G 17/38 104/180 |
| 900,749 A | * | 10/1908 | Leonard ................ | B61B 12/02 105/148 |

(Continued)

FOREIGN PATENT DOCUMENTS

| BR | PI0509183-7 A | 9/2007 |
|---|---|---|
| CN | 103495537 A | 1/2014 |
| CN | 104838523 A | 8/2015 |

(Continued)

OTHER PUBLICATIONS

International Search Report mailed on Jan. 17, 2023, received for PCT Application PCT/CN2022/131126, filed on Nov. 10, 2022, 7 pages including English Translation.

*Primary Examiner* — William R Harp
(74) *Attorney, Agent, or Firm* — XSENSUS LLP

(57) ABSTRACT

This application relates to a conveyor and a baking device. A traction rope may bring an electrode plate to move in a transport space. The traction rope may be of high flexibility and can more smoothly bring the electrode plate to move in various complex environments such as an arcuate oven, thereby effectively avoiding derailment or jamming of the conveyor in the oven and conveying the electrode plate more smoothly in the oven.

16 Claims, 4 Drawing Sheets

(56) References Cited

U.S. PATENT DOCUMENTS 1,753,914 A * 4/1930 Bodge ..................... A21B 1/46
                                                    198/802

FOREIGN PATENT DOCUMENTS

| CN | 206046433 U | 3/2017 |
| CN | 112304070 A | 2/2021 |
| CN | 214234797 U | 9/2021 |
| CN | 217172649 U | 8/2022 |
| KR | 10-2019-0084571 A | 7/2019 |

* cited by examiner

CONVEYOR AND BAKING DEVICE

CROSS-REFERENCE TO RELATED APPLICATIONS

This present application is a continuation of International Application No. PCT/CN2022/131126, filed Nov. 10, 2022, which claims priority to Chinese Patent Application No. 202220424505.0, filed on Feb. 28, 2022 and entitled "CONVEYOR AND BAKING DEVICE", both of which are incorporated herein by reference in its entirety.

TECHNICAL FIELD

This application relates to the technical field of batteries, and in particular, to a conveyor and a baking device.

BACKGROUND

During the coating of an electrode plate of a battery, the electrode plate needs to be dried in an oven. To ensure a good drying effect and high production efficiency, the oven is usually long in shape, and a plurality of guide rollers are disposed inside the oven. Therefore, a relatively large section of the electrode plate is located in the oven during the coating, thereby increasing the probability of breaking off the electrode plate inside the oven.

When the electrode plate breaks inside the oven, due to the great length of the oven, a side door of the oven has to be opened, and the broken electrode plate is manually pulled out of the oven for connecting. In this process, because a part of the electrode plate is pulled out of the oven, the pulling force direction deviates from a movement direction of the electrode plate in the oven, thereby resulting in misalignment or even repeated breakage of the electrode plate. In addition, if the broken electrode plate is manually reconnected from a side of the oven, the production efficiency is not high.

SUMMARY

In view of the above situation, it is necessary to provide a conveyor and a baking device to solve the problem of inconvenience of handling breakage of an electrode plate occurring during coating and drying of the electrode plate.

According to a first aspect, this application provides a conveyor, configured to convey an electrode plate and including: a main body, a guide mechanism or structure, and a driving mechanism or structure. The main body includes a transport space for accommodating the electrode plate. The guide mechanism is disposed in the transport space and includes a traction rope. The traction rope extends along a conveyance direction of the electrode plate and is connected to the electrode plate to bring the electrode plate to move. The driving mechanism is drivingly connected to the traction rope, so as to drive the traction rope to bring the electrode plate to move along the conveyance direction.

In the technical solution in an embodiment of this application, the guide mechanism can fix the electrode plate and bring the electrode plate to move along the conveyance direction. In this way, the electrode plate can be automatically conveyed in the transport space to facilitate reconnection of the electrode plate that has broken. In addition, the traction rope is of high flexibility, and therefore, can more smoothly bring the electrode plate to move along a specified path in the oven, thereby avoiding derailment or jamming during movement and conveying the electrode plate more smoothly and steadily in the oven.

The foregoing description is merely an overview of the technical solutions of this application. Some specific embodiments of this application are described below illustratively to enable a clearer understanding of the technical solutions of this application, enable implementation of the technical solutions based on the subject-matter hereof, and make the foregoing and other objectives, features, and advantages of this application more evident and comprehensible.

BRIEF DESCRIPTION OF DRAWINGS

By reading the following detailed description of embodiments, a person of ordinary skill in the art becomes clearly aware of various other advantages and benefits. The drawings are merely intended to illustrate the embodiments, but not to limit this application. In all the drawings, the same reference numeral represents the same component. In the drawings.

Figure 1:
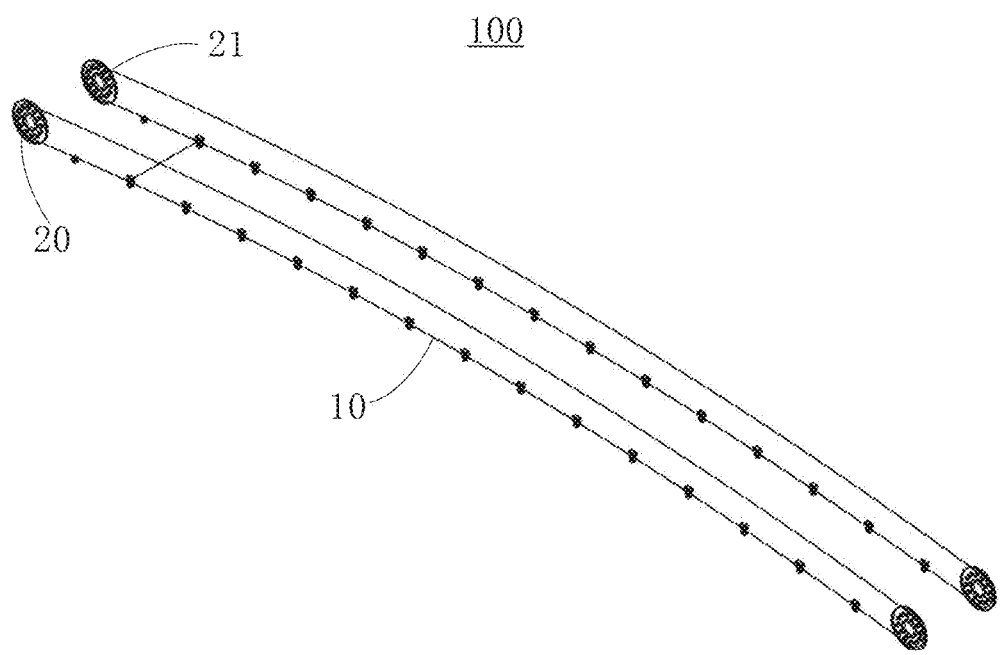
FIG. 1 is a schematic structural diagram of a conveyor according to an embodiment of this application.

100. conveyor; 10. guide mechanism; 20. driving mechanism; 30. supporting roller; 40. pressure roller; 50. floating mechanism; 11. traction rope; 12. connecting assembly; 13. electrode plate; 14. main body; 21. driving roller; 31. guide slot; 51. fastener; 52. elastomer; 111. first sub-rope; 112. second sub-rope; 113. conveyance space; 121. connecting body; 122. fixing portion; 123. first subsection; 124. second subsection; 125. clamping position; 126. adjusting piece.

DETAILED DESCRIPTION OF EMBODIMENTS

Some embodiments of the technical solutions of this application are described in detail below with reference to the drawings. The following embodiments are merely intended as examples to describe the technical solutions of this application more clearly, but not intended to limit the protection scope of this application.

Unless otherwise defined, all technical and scientific terms used herein bear the same meanings as what is normally understood by a person skilled in the technical field of this application. The terms used herein are merely intended to describe specific embodiments but not to limit this application. The terms "include" and "contain" and any variations thereof used in the specification, claims, and brief description of drawings of this application are intended as non-exclusive inclusion.

In the description of the embodiments of this application, the technical terms "first" and "second" are merely intended to distinguish between different items but not intended to indicate or imply relative importance or implicitly specify the number of the indicated technical features, specific order, or order of precedence. In the description of the embodiments of this application, unless otherwise expressly specified, "a plurality of" means two or more.

Reference to an "embodiment" herein means that a specific feature, structure or characteristic described with reference to this embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described herein may be combined with other embodiments.

In the description of embodiments of this application, the term "and/or" merely indicates a relationship between related items, and represents three possible relationships. For example, "A and/or B" may represent the following three circumstances: A alone, both A and B, and B alone. In addition, the character "/" herein generally indicates an "or" relationship between the item preceding the character and the item following the character.

In the description of embodiments of this application, the term "a plurality of" means two or more (including two). Similarly, "a plurality of groups" means two or more groups (including two groups), and "a plurality of pieces" means two or more pieces (including two pieces).

In the description of embodiments of this application, a direction or a positional relationship indicated by the terms such as "center", "longitudinal", "transverse", "length", "width", "thickness", "up", "down", "before", "after", "left", "right", "vertical", "horizontal", "top", "bottom", "in", "out", "clockwise", "counterclockwise", "axial", "radial", and "circumferential" is a direction or positional relationship based on the illustration in the drawings, and is merely intended for ease or brevity of description of embodiments of this application, but not intended to indicate or imply that the indicated device or component is necessarily located in the specified direction or constructed or operated in the specified direction. Therefore, such terms are not to be understood as a limitation on embodiments of this application.

In the description of the embodiments of this application, unless otherwise expressly specified and defined, the technical terms such as "mounting", "concatenation", "connection", and "fixing" need to be understood in a broad sense, for example, understood as a fixed connection or a detachable connection or integrally formed; or understood as a mechanical connection or an electrical connection; understood as a direct connection, or an indirect connection implemented through an intermediary; or understood as internal communication between two components or interaction between two components. A person of ordinary skill in the art can understand the specific meanings of the terms in the embodiments of this application according to specific situations.

Currently, as can be seen from the market trend, the application of power batteries is increasingly extensive. Power batteries are not only used in energy storage power systems such as hydro, thermal, wind, and solar power stations, but also widely used in electric means of transport such as electric bicycles, electric motorcycles, and electric vehicles, and used in many other fields such as military equipment and aerospace. The market demand for power batteries keeps soaring with the increase of the application fields of the power batteries.

A production process of a power battery includes a coating step. In the coating step, a coated electrode plate of the battery needs to be dried in an oven before a next step of processing. However, in order to ensure a good drying effect and high production efficiency, the oven is usually in a long shape so that the electrode plate can be sufficiently dried. For this reason, during the movement of the electrode plate in the oven, the electrode plate is prone to break off due to a nonuniform force exerted on the electrode plate.

To cope with the problem of breakage of the electrode plate, in a case that no auxiliary apparatus is in use, a conventional method is that an operator stops heating the oven. After the temperature in the oven drops to an appropriate level, the operator opens a side door of the oven after wearing labor protection clothes, and manually pulls the electrode plate in the oven from a side to pass the electrode plate through the oven. After the electrode plate is pulled out of the oven, a broken section of electrode plate is connected to another broken section by the operator, and is wound up through slow conveyance. This period is time-consuming. Specifically, it takes a long time to cool the oven, and to heat up the oven after restart. In addition, when a part of the electrode plate is manually pulled out of the oven, the pulling force direction is prone to deviate from the movement direction of the electrode plate in the oven, thereby resulting in misalignment or even repeated breakage of the electrode plate. In addition, due to a narrow space in the oven, the operation of manually pulling the electrode plate out of the oven is inconvenient, time-consuming, and labor-consuming.

Therefore, currently, an auxiliary conveyance structure is disposed inside the oven. For example, a guide rail and a movable piece located in the guide rail are disposed, so that the movable piece brings the electrode plate to run along the guide rail. The inner space of some ovens is not completely flat and straight, but is arcuate. For the arcuate oven, in the prior art, a chain is usually used to bring the electrode plate to move in the oven. The chain is mounted in the oven in two manners. One of the mounting manners is to use a chain in conjunction with a guide rail, so that the chain moves in the guide rail to bring the electrode plate to move. In this manner, the mounting process is demanding. If the chain is not mounted properly, the chain is prone to jamming in the arcuate oven, thereby being adverse to practical applications. The other manner is to use sprockets to support the chain. In this manner, due to the heavy weight of the chain, the chain is prone to derail and result in breakage of the electrode plate, and the mounting process is complicated.

Through research based on the above situation, the applicant hereof finds that the electrode plate may be pulled by a traction rope to move in the arcuate oven. Due to the low weight of the traction rope, the traction rope is not prone to derail during the movement, thereby more stably bringing the electrode plate to move. In addition, due to higher flexibility of the traction rope, the mounting of the traction rope inside the oven is more flexible and convenient. The traction rope can pull the electrode plate to move smoothly in a complicated environment.

Based on the above considerations, in order to solve the problem that the conveyor is prone to derailment or jamming when bringing the electrode plate to move in an arcuate oven and results in low production efficiency and probable breakage of the electrode plate, the applicant has designed a conveyor and a baking device through in-depth research, in which a traction rope brings the electrode plate to move so that the electrode plate is conveyed more smoothly.

Figure 2:
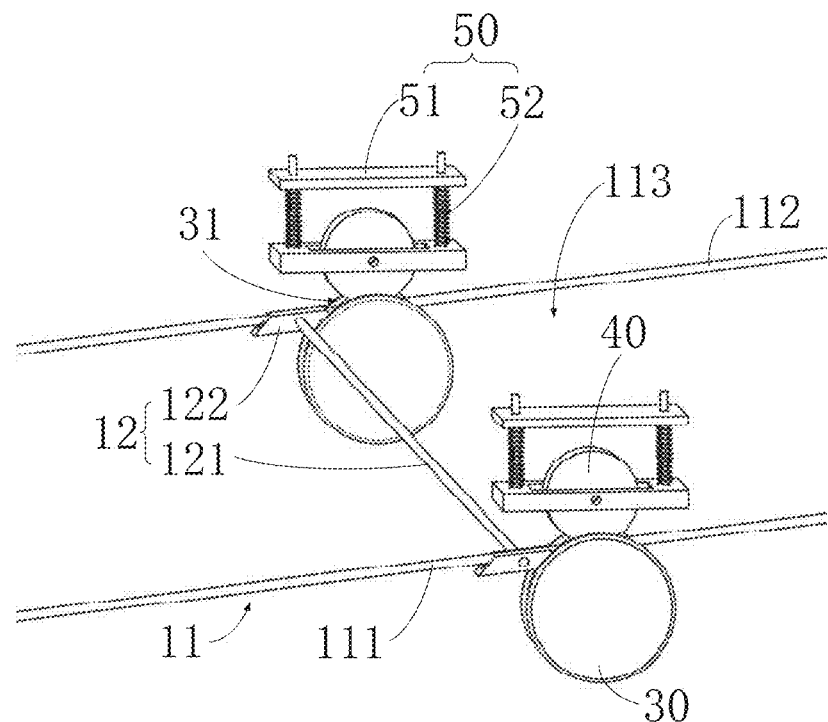
FIG. 2 is a schematic diagram of a partial structure of a conveyor according to an embodiment of this application.
Figure 6:
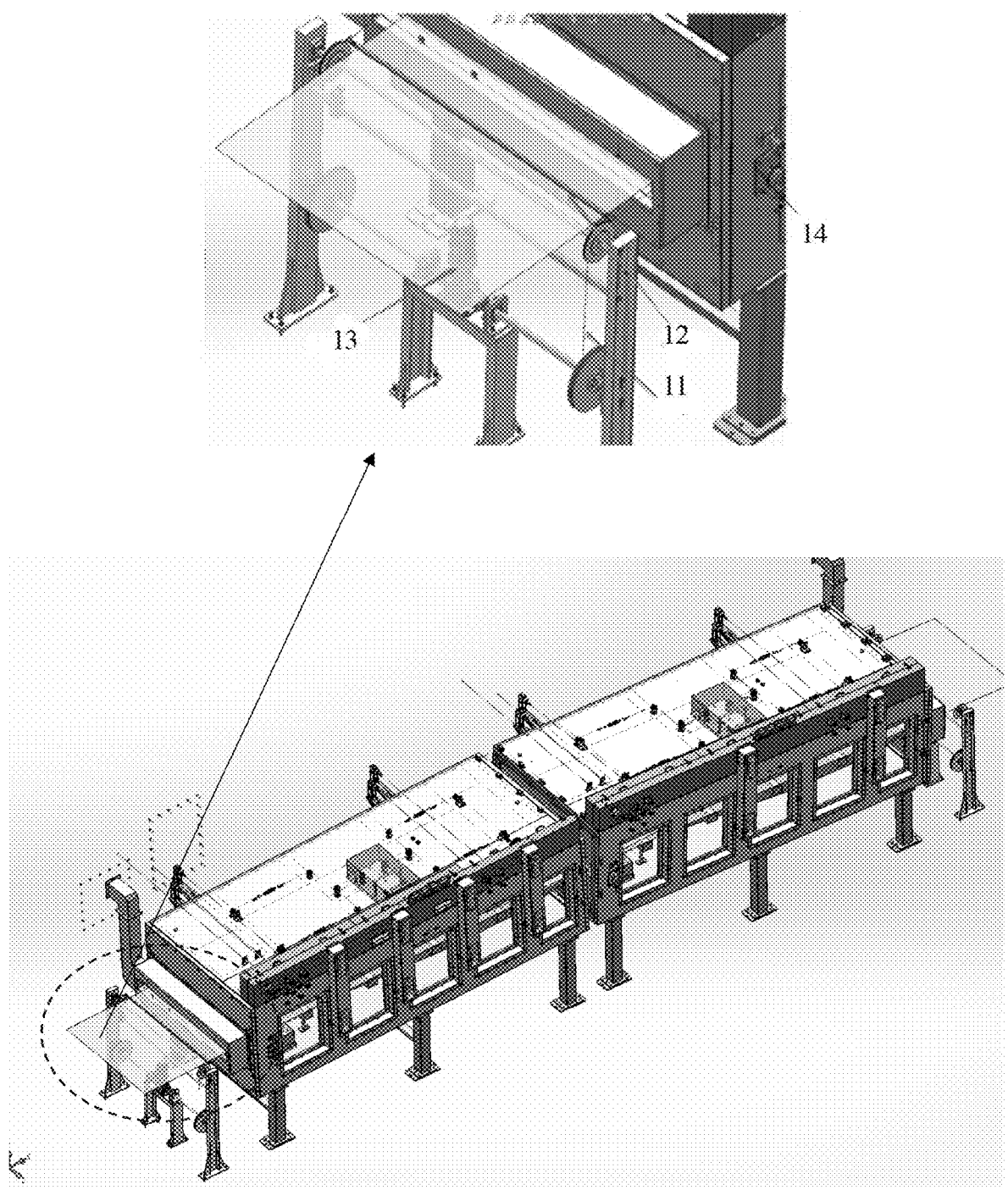
FIG. 6 is a schematic structural diagram of a main body according to one embodiment of this application.

Referring to FIG. 1, FIG. 2 and FIG. 6, FIG. 1 is a schematic structural diagram of a conveyor according to an embodiment of this application, and FIG. 2 is a schematic diagram of a partial structure of a conveyor according to an embodiment of this application. FIG. 6 is a schematic structural diagram of a main body according to one embodiment of this application. This utility model provides a conveyor 100, configured to convey an electrode plate. The conveyor 100 includes: a main body 14, a guide mechanism 10, and a driving mechanism 20. The main body includes a transport space for accommodating the electrode plate 13. The guide mechanism 10 is disposed in the transport space. In addition, the guide mechanism 10 includes a traction rope 11. The traction rope 11 extends along a conveyance direction of the electrode plate 13 and is connected to the electrode plate 13 to bring the electrode plate 13 to move. The driving mechanism 20 is drivingly connected to the traction rope 11, so as to drive the traction rope 11 to bring the electrode plate to move along the conveyance direction.

It is hereby noted that the traction rope 11 may be a steel wire rope. The steel wire rope is of high rigidity and can reduce the risk of breaking off during the conveyance, and therefore, can serve to stably support the electrode plate. In addition, metal particles are prone to be generated by friction of the steel wire rope in motion. The metal particles are prone to adhere to and pollute the electrode plate in a high-temperature environment inside the oven. Therefore, the steel wire rope is coated with a non-metallic protection layer. The non-metallic protection layer not only protects the steel wire rope to some extent, but also prevents the electrode plate from being polluted by the metal particles generated during the movement, thereby ensuring high quality of the electrode plate.

Understandably, in some other embodiments, the traction rope 11 may be another similar rope structure other than the steel wire rope, or be directly a rope structure made of a non-metallic material, details of which are omitted here.

Specifically, in this embodiment, the conveyor 100 is configured to convey the electrode plate in the oven. Therefore, the conveyor 100 is disposed inside the oven. That is, the transport space is located inside the oven. The traction rope 11 is fixedly connected to the electrode plate. As driven by the driving mechanism 20, the traction rope 11 may bring the electrode plate to move along a specified path. The traction rope 11 is of high flexibility, and therefore, can more smoothly bring the electrode plate to move along a specified path in the oven, thereby avoiding derailment or jamming during movement and conveying the electrode plate more smoothly and steadily in the oven.

In addition, the traction rope 11 is fixed to the electrode plate by being indirectly connected to the electrode plate. To be specific, the electrode plate may be fixed to the traction rope 11 by means of a connecting piece, thereby implementing stable connection between the electrode plate and the traction rope 11.

As shown in FIG. 2, the conveyor 100 includes a supporting roller 30 disposed under the traction rope 11 along a gravity direction. A guide slot 31 that extends along the transport space is made on the supporting roller 30. The traction rope 11 is disposed in the guide slot 31.

Specifically, the guide slot 31 is disposed along a circumferential direction of the supporting roller 30, and the guide slot 31 is in a middle-recessed shape. The supporting roller 30 is fixed onto an inner sidewall of the oven through an axle of the supporting roller, and can rotate around the axle. When the traction rope 11 is accommodated in the guide slot 31, the supporting roller 30, on the one hand, serves to support the traction rope 11 and prevents the traction rope 11 from drooping due to its own gravity. In addition, the middle-recessed guide slot 31 prevents the traction rope 11 from coming out of the guide slot, and ensures stability of movement of the traction rope 11 in the guide slot 31.

Further, in practical applications, the supporting roller 30 is fixed onto the inner sidewall of the oven, and a plurality of supporting rollers are disposed along the conveyance direction. The guide slots 31 on all supporting rollers 30 jointly form a discontinuous guide path, so that the steel wire rope can bring the electrode plate to move along the guide path. In addition, the guide slot 31 can limit the steel wire rope to a specified position to prevent the steel wire rope from detaching from the supporting roller 30, and in turn, reduce the risk of breaking the electrode plate.

In some embodiments, the supporting roller 30 includes a first sub-roller and a second sub-roller. The first sub-roller and the second sub-roller are spaced apart in a horizontal plane that intersects the conveyance direction. The traction rope 11 includes a first sub-rope 111 and a second sub-rope 112. The first sub-rope 111 and the second sub-rope 112 are disposed in the guide slot 31 of the first sub-roller and the second sub-roller respectively. A conveyance space 113 for accommodating the electrode plate is formed between the first sub-rope and the second sub-rope. The guide mechanism 10 includes a connecting assembly 12. Two ends of the connecting assembly 12 are connected to the first sub-rope 111 and the second sub-rope 112 respectively, so as to fix the electrode plate in the conveyance space 113.

Specifically in this embodiment, the first sub-roller and the second sub-roller are disposed on two sides of the electrode plate respectively along a width direction of the electrode plate, and the first sub-rope 111 and the second sub-rope 112 are disposed on the two sides of the electrode plate along the width direction. The first sub-roller and the second sub-roller on the two sides of the electrode plate are fixed onto two opposite inner sidewalls in the oven respectively, and therefore, are disposed opposite to each other so that the first sub-rope 111 and the second sub-rope 112 can be accommodated in the guide slot 31 of the first sub-roller and the second sub-roller respectively.

Further, a plurality of sets of first sub-rollers and second sub-rollers are arranged along the conveyance direction of the electrode plate. In each set, the first sub-roller and the second sub-roller are disposed corresponding to each other. Therefore, the traction rope 11 can extend along the arrangement path of the first sub-rollers and second sub-rollers, so as to bring the electrode plate to move along the path.

A conveyance space 113 is formed between the first sub-rope 111 and the second sub-rope 112. The electrode plate is located in the conveyance space 113. In addition, the connecting assembly 12 is a conveyance rod. Two ends of the conveyance rod are fixedly connected to the first sub-rope 111 and the second sub-rope 112 respectively, and the conveyance rod is fixed to the electrode plate. In this way, when the first sub-rope 111 and the second sub-rope 112 move in the guide slot 31 as driven by the driving mechanism 20, the conveyance rod can bring the electrode plate to move synchronously.

In some embodiments, the connecting assembly 12 includes a connecting body 121 and at least one fixing portion or structure 122 disposed on the connecting body 121. The fixing portion 122 is configured to fix the first sub-rope 111 and/or the second sub-rope 112, so as to connect the connecting assembly 12 and the traction rope 11.

Specifically in this embodiment, two fixing portions 122 are disposed at the two ends of the connecting body 121 respectively. The connecting body 121 is a rod body of the conveyance rod. The fixing portions 122 located at the two ends of the rod body are configured to fix the first sub-rope 111 and the second sub-rope 112.

Further, the two ends of the rod body may be fixedly connected to the first sub-rope 111 and the second sub-rope 112 by the fixing portion 122. That is, the first sub-rope 111 and the second sub-rope 112 are directly threaded through the fixing portion 122, as shown in FIG. 2, so as to implement fixed connection between the rod body and the sub-ropes. This method makes the connection more stable.

In addition, the two ends of the fixing portion 122 are chamfered, so that the fixing portion 122 forms a trapezoidal structure. In this way, the fixing portion 122 can pass between the supporting roller 30 and the pressure roller 40 that corresponds to the supporting roller, and avoid jamming caused when the fixing portion 122 passes between the supporting roller 30 and the pressure roller 40.

Figure 3:
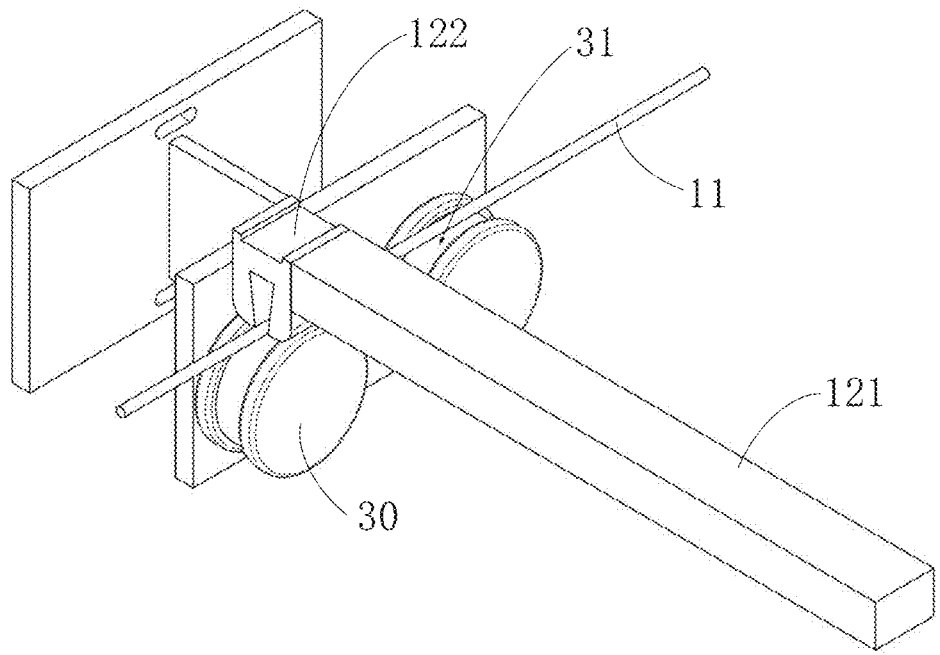
FIG. 3 is a schematic diagram of a partial structure of a conveyor according to another embodiment of this application.

Referring to FIG. 3, FIG. 3 is a schematic diagram of a partial structure of a conveyor according to another embodiment of this application. In some embodiments, the fixing portion 122 is structured as a clamping piece and is configured to clamp the first sub-rope 111 and/or the second sub-rope 112. Specifically, the clamping piece includes two plate-shaped fittings spaced apart. A fixing position is formed between the two plate-shaped fittings. The two plate-shaped fittings can move toward each other or away from each other to change the size of the fixing position. The fixing position may be configured to accommodate the traction rope 11. To clamp the traction rope 11, the traction rope 11 is placed in the fixing position, and the two plate-shaped fittings are caused to move toward each other until the traction rope 11 is clamped and fixed. To unclamp the traction rope 11, the two plate-shaped fittings are just caused to move away from each other to enlarge the fixing position between the two plate-shaped fittings, so that the traction rope 11 is released from between the two plate-shaped fittings.

During the conveyance of the electrode plate in the oven, the clamping piece can clamp and fix the first sub-rope 111 and the second sub-rope 112 separately to implement the connection between the electrode plate and the conveyance rod, thereby bringing the electrode plate to move. When the electrode plate stops moving or needs to undergo another operation, the clamping piece may release the first sub-rope 111 and the second sub-rope 112 to separate the electrode plate from the traction rope, thereby being more flexible and convenient.

Referring to FIG. 2 again, in some embodiments, the conveyor 100 includes a pressure roller 40. The pressure roller 40 is disposed corresponding to the supporting roller 30. A limiting space is defined between the pressure roller 40 and the supporting roller. The traction rope 11 is disposed in the limiting space.

Specifically, the pressure roller 40 is fixed onto an inner sidewall of the oven through an axle of the pressure roller, and can rotate around the axle. In addition, the pressure roller 40 is disposed above the supporting roller 30 along the gravity direction, and the pressure roller 40 is disposed in one-to-one correspondence with the supporting roller 30. A limiting space is formed between the pressure roller 40 and the corresponding supporting roller 30 in each set along the gravity direction. The first sub-rope 111 and the second sub-rope 112 can be positioned in the limiting space.

When the first sub-rope 111 and the second sub-rope 112 move in the guide slot 31 on the corresponding supporting roller 30, the first sub-rope 111 and the second sub-rope 112 may be detached from the guide slot 31 along the width direction of the electrode plate, thereby resulting in derailment. The derailment of the first sub-rope 111 and the second sub-rope 112 will stress the electrode plate nonuniformly during conveyance, thereby leading to breakage of the electrode plate.

After the pressure roller 40 is disposed, the pressure roller 40 generates a downward pressure on the first sub-rope 111 and the second sub-rope 112, and limits the first sub-rope 111 and the second sub-rope 112 to a position in the corresponding guide slot 31 along the gravity direction, thereby preventing the first sub-rope 111 and the second sub-rope 112 from detaching from the guide slot 31.

In some embodiments, the conveyor 100 includes a floating mechanism or structure 50. The floating mechanism 50 includes a fastener 51 and an elastomer 52. The fastener 51 is fixedly connected to the main body. One end of the elastomer 52 is connected to the fastener 51, and another end of the elastomer is connected to the pressure roller 40, so as to change a distance between the pressure roller 40 and the supporting roller 30.

In a specific embodiment, the elastomer 52 may be a spring. The spring is connected between the fastener 51 and the pressure roller 40 to adjust the distance between the pressure roller 40 and the supporting roller 30. Understandably, the elastomer 52 may be of another structure similar to a spring, details of which are omitted here.

Specifically, the fixing piece 51 is fixedly disposed on the inner wall of the oven. The elastomer 52 is connected between the fastener 51 and the pressure roller 40. Therefore, when the first sub-rope 111 and the second sub-rope 112 are located in the limiting space, because the mounting error is inevitable, the first sub-rope 111 and the second sub-rope 112 will float up and down during the movement. The elastomer 52 can adjust the distance between the pressure roller 40 and the supporting roller 30 according to the extent of upward and downward floating of the first sub-rope 111 and the second sub-rope 112, so that the first sub-rope 111 and the second sub-rope 112 can pass through the limiting space more smoothly.

Figure 4:
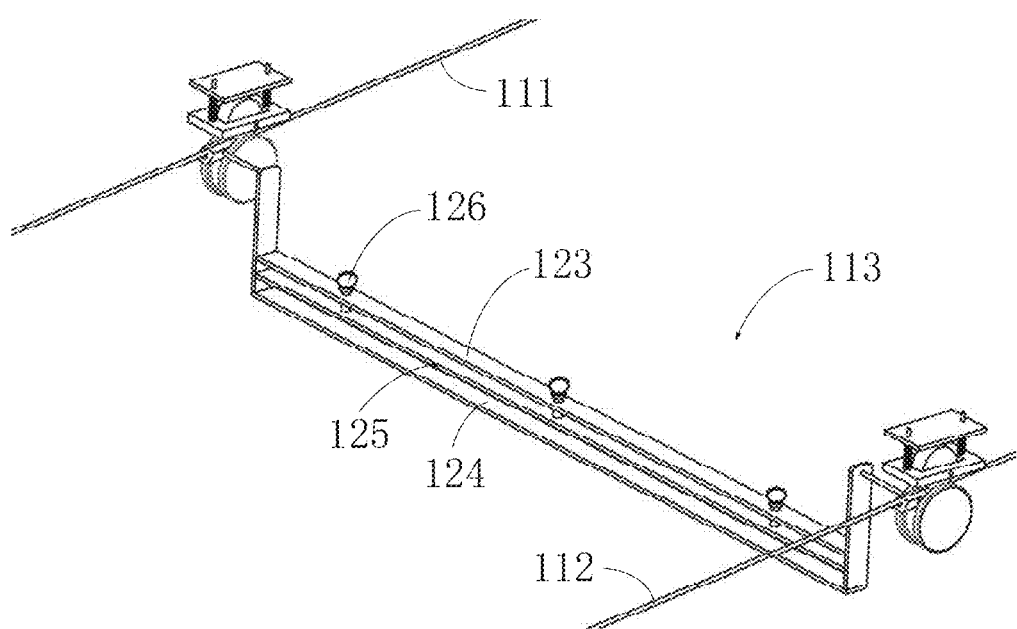
FIG. 4 is a schematic diagram of a partial structure of a conveyor according to an embodiment of this application.
Figure 5:
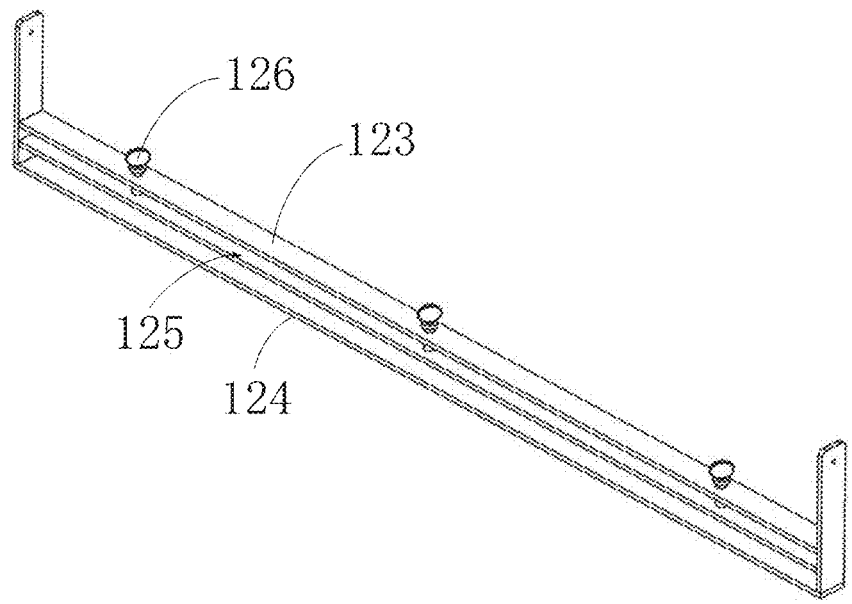
FIG. 5 is a schematic structural diagram of a connecting assembly according to an embodiment of this application.

Referring to FIG. 4 and FIG. 5, FIG. 4 is a schematic structural diagram of a conveyor according to an embodiment of this application, and FIG. 5 is a schematic structural diagram of a connecting assembly according to an embodiment of this application. To fix the connecting assembly 12 to the electrode plate more firmly, the connecting assembly 12 includes a first subsection 123 and a second subsection 124 that are spaced apart. A clamping position 125 configured to clamp the electrode plate is formed between the first subsection 123 and the second subsection 124.

Specifically, the rod body of the conveyance rod is divided into a first subsection 123 and a second subsection 124. The first subsection 123 and the second subsection 124 are disposed apart along the gravity direction. In this way, a clamping position 125 is formed between the first subsection 123 and the second subsection 124, and the electrode plate is clamped in the clamping position 125, so that the connection between the electrode plate and the conveyance rod is more stable.

In some embodiments, the connecting assembly 12 includes an adjusting piece or structure 126 connected between the first subsection 123 and the second subsection 124. The adjusting piece 126 is configured to adjust a distance between the first subsection 123 and the second subsection 124 in a gravity direction.

Specifically in this embodiment, the adjusting piece 126 is an adjusting bolt disposed between the first subsection 123 and the second subsection 124. The adjusting bolt can change the distance between the first subsection 123 and the second subsection 124 in the gravity direction. In this way, the clamping position 125 between the first subsection 123 and the second subsection 124 can adapt to electrode plates of different thicknesses, and prevent the electrode plate from being damaged by unduly tight clamping of the electrode plate by the first subsection 123 and the second subsection 124 or prevent detachment of the electrode plate caused by loose clamping.

Therefore, by controlling the adjusting piece 126, the dimensions of the clamping position 125 can be adjusted according to an actual thickness of the electrode plate, so as to clamp the electrode plate more firmly in the clamping position 125 and ensure stability of conveyance of the electrode plate.

Referring to FIG. 1 again, in some embodiments, the driving mechanism 20 includes a driving roller 21 and a driving source (not shown in the drawing) that are drivingly connected. The traction rope 11 is wound around the driving roller 21 end-to-end along the conveyance direction, so as to move along the conveyance direction as driven by the driving source.

Specifically, two driving rollers 21 are disposed at a start end of the oven, and at a terminating end of the oven, separately. The two driving rollers are spaced along the width direction of the electrode plate. The first sub-rope 111 and the second sub-rope 112 each are wound around the driving rollers 21 end-to-end along the conveyance direction of the electrode plate, where the driving rollers are located at the start end and the terminating end of the oven respectively. The driving rollers 21 can rotate as driven by the driving source, thereby bringing the first sub-rope 111 and the second sub-rope 112 to move along the conveyance direction of the electrode plate and implementing conveyance of the electrode plate.

Due to scanty space available in the oven, the driving rollers 21 are usually disposed outside the oven and located at a start entrance and a terminating entrance of the oven respectively, and bring the first sub-rope 111 and the second sub-rope 112 to move.

Based on the same conception as the conveyor 100 described in the preceding embodiments, this application provides a baking device configured to dry an electrode plate. The baking device includes an oven and the conveyor 100 described above. The oven includes an accommodation space configured to dry the electrode plate, and the conveyor 100 is disposed in the accommodation space.

In a practical implementation of this application, the driving roller 21 rotates as driven by the driving source, thereby bringing the first sub-rope 111 and the second sub-rope 112 to move along the conveyance direction of the electrode plate. Inside the oven, the first sub-rope 111 and the second sub-rope 112 move along the guide slot 31 on the corresponding supporting roller 30. The pressure rollers 40 located above the first sub-rope 111 and the second sub-rope 112 can prevent the first sub-rope 111 and the second sub-rope 112 from detaching from the guide slot 31.

When the conveyance rod passes between the supporting roller 30 and the pressure roller 40, the supporting roller 30 and the pressure roller 40 can roll over the fixing portion 122. At the same time, the spring adjusts the distance between the supporting roller 30 and the pressure roller 40 in the gravity direction, so that the conveyance rod can pass through the limiting space smoothly.

The conveyor 100 and the baking device in the foregoing embodiments have at least the following advantages:

(1) The first sub-rope 111 and the second sub-rope 112 are of high flexibility, and can bring the electrode plate to move smoothly in a complicated environment inside an arcuate oven, thereby reducing the risk of the jam or derailment of the conveyor 100 and avoiding breakage of the electrode plate;

(2) The supporting roller 30 serves to support the first sub-rope 111 and the second sub-rope 112, and prevents the first sub-rope 111 and the second sub-rope 112 from drooping due to gravity, thereby reducing the force exerted on the first sub-rope 111 and the second sub-rope 112;

(3) The guide slot 31 on the supporting roller 30 can limit the positions of the first sub-rope 111 and the second sub-rope 112 along the width direction of the electrode plate, thereby avoiding breakage of the electrode plate caused by detachment of the first sub-rope 111 and the second sub-rope 112 from the guide slot 31 during movement;

(4) The clamping piece enables the conveyance rod to be connected to the first sub-rope 111 and the second sub-rope 112 by means of clamping, thereby making the connection manner more flexible and facilitating disassembly;

(5) The pressure roller 40 can generate a downward pressure on the first sub-rope 111 and the second sub-rope 112, and limit the first sub-rope 111 and the second sub-rope 112 to a position in the guide slot 31 along the gravity direction, thereby making the first sub-rope 111 and the second sub-rope 112 move more smoothly in the guide slot 31;

(6) The spring can flexibly adjust the distance between the supporting roller 30 and the pressure roller 40, so that the fixing portion 122 can smoothly pass through the limiting space between the supporting roller and the pressure roller and enable smoother conveyance of the electrode plate; and (7) A clamping position 125 is formed between the first subsection 123 and the second subsection 124, so that the electrode plate can be fixed more flexibly according to the actual thickness of the electrode plate, and the electrode plate can be connected to the conveyance rod more firmly and prevented from detaching from the conveyance rod during conveyance.

Finally, it is hereby noted that the foregoing embodiments are merely intended to describe the technical solutions of this application but not to limit this application. Although this application has been described in detail with reference to the foregoing embodiments, a person of ordinary skill in the art understands that modifications may still be made to the technical solutions described in the foregoing embodiments, or equivalent replacements may still be made to some or all technical features in the technical solutions. Such modifications and equivalent replacements fall within the scope of the claims and specification hereof without making the essence of the corresponding technical solutions depart from the scope of the technical solutions of the embodiments of this application. Particularly, to the extent that no structural conflict exists, various technical features mentioned in different embodiments may be combined in any manner. This application is not limited to the specific embodiments disclosed herein, but includes all technical solutions falling within the scope of the claims.

What is claimed is:

1. A conveyor for conveying an electrode plate, comprising:
a main body, wherein the main body comprises a transport space for accommodating the electrode plate;

a guide structure, wherein the guide structure is disposed in the transport space and comprises a traction rope, and the traction rope extends along a conveyance direction of the electrode plate and is connected to the electrode plate to bring the electrode plate to move;

a driving structure, wherein the driving structure is drivingly connected to the traction rope, so as to drive the traction rope to bring the electrode plate to move along the conveyance direction;

a supporting roller disposed under the traction rope along a gravity direction, wherein a guide slot that extends along the conveyance direction is made on the supporting roller, and the traction rope is disposed in the guide slot;

a pressure roller, wherein the pressure roller is disposed corresponding to the supporting roller, a limiting space is defined between the pressure roller and the supporting roller, and the traction rope is disposed in the limiting space; and a floating structure, the floating structure comprising:

a fastener, fixedly connected to the main body; and an elastomer, wherein one end of the elastomer is connected to the fastener, and another end of the elastomer is connected to the pressure roller, so as to change a distance between the pressure roller and the supporting roller.

2. The conveyor according to claim 1, wherein the supporting roller comprises a first sub-roller and a second sub-roller, and the first sub-roller and the second sub-roller are spaced apart in a horizontal plane that intersects the conveyance direction;

the traction rope comprises a first sub-rope and a second sub-rope, the first sub-rope and the second sub-rope are disposed in the guide slot of the first sub-roller and the second sub-roller respectively, and a conveyance space for accommodating the electrode plate is formed between the first sub-rope and the second sub-rope; and the guide structure comprises a connecting assembly, and two ends of the connecting assembly are connected to the first sub-rope and the second sub-rope respectively, so as to fix the electrode plate in the conveyance space.

3. The conveyor according to claim 2, wherein the connecting assembly comprises a connecting body and at least one fixing structure disposed on the connecting body, and the fixing structure is configured to fix the first sub-rope and/or the second sub-rope, so as to connect the connecting assembly and the traction rope.

4. The conveyor according to claim 3, wherein the fixing structure is structured as a clamping piece and is configured to clamp the first sub-rope and/or the second sub-rope.

5. The conveyor according to claim 2, wherein the connecting assembly comprises a first subsection and a second subsection that are spaced apart, and a clamping position configured to clamp the electrode plate is formed between the first subsection and the second subsection.

6. The conveyor according to claim 5, wherein the connecting assembly comprises an adjusting structure connected between the first subsection and the second subsection, and the adjusting structure is configured to adjust a distance between the first subsection and the second subsection in a gravity direction.

7. The conveyor according to claim 1, wherein the driving structure comprises a driving roller and a driving source that are drivingly connected, and the traction rope is wound around the driving roller end-to-end along the conveyance direction, so as to move along the conveyance direction as driven by the driving source.

8. A baking device for drying an electrode plate, comprising:

an oven, wherein an accommodation space configured to dry the electrode plate is provided in the oven; and the conveyor according to claim 1, wherein the conveyor is disposed in the accommodation space.

9. A conveyor for conveying an electrode plate, comprising:

a main body, wherein the main body comprises a transport space for accommodating the electrode plate;

a guide structure, wherein the guide structure is disposed in the transport space and comprises a traction rope, and the traction rope extends along a conveyance direction of the electrode plate and is connected to the electrode plate to bring the electrode plate to move;

a driving structure, wherein the driving structure is drivingly connected to the traction rope, so as to drive the traction rope to bring the electrode plate to move along the conveyance direction; and a supporting roller disposed under the traction rope along a gravity direction, wherein a guide slot that extends along the conveyance direction is made on the supporting roller, and the traction rope is disposed in the guide slot;

wherein the supporting roller comprises a first sub-roller and a second sub-roller, and the first sub-roller and the second sub-roller are spaced apart in a horizontal plane that intersects the conveyance direction;

the traction rope comprises a first sub-rope and a second sub-rope, the first sub-rope and the second sub-rope are disposed in the guide slot of the first sub-roller and the second sub-roller respectively, and a conveyance space for accommodating the electrode plate is formed between the first sub-rope and the second sub-rope;

the guide structure comprises a connecting assembly, and two ends of the connecting assembly are connected to the first sub-rope and the second sub-rope respectively, so as to fix the electrode plate in the conveyance space; and the connecting assembly comprises a first subsection and a second subsection that are spaced apart, and a clamping position configured to clamp the electrode plate is formed between the first subsection and the second subsection.

10. The conveyor according to claim 9, wherein the connecting assembly comprises a connecting body and at least one fixing structure disposed on the connecting body, and the fixing structure is configured to fix the first sub-rope and/or the second sub-rope, so as to connect the connecting assembly and the traction rope.

11. The conveyor according to claim 10, wherein the fixing structure is structured as a clamping piece and is configured to clamp the first sub-rope and/or the second sub-rope.

12. The conveyor according to claim 9, wherein the conveyor further comprises a pressure roller, the pressure roller is disposed corresponding to the supporting roller, a limiting space is defined between the pressure roller and the supporting roller, and the traction rope is disposed in the limiting space.

13. The conveyor according to claim 12, wherein the conveyor further comprises a floating structure, and the floating structure comprises:

a fastener, fixedly connected to the main body; and an elastomer, wherein one end of the elastomer is connected to the fastener, and another end of the elastomer is connected to the pressure roller, so as to change a distance between the pressure roller and the supporting roller.

14. The conveyor according to claim 9, wherein the connecting assembly comprises an adjusting structure connected between the first subsection and the second subsection, and the adjusting structure is configured to adjust a distance between the first subsection and the second subsection in a gravity direction.

15. The conveyor according to claim 9, wherein the driving structure comprises a driving roller and a driving source that are drivingly connected, and the traction rope is wound around the driving roller end-to-end along the conveyance direction, so as to move along the conveyance direction as driven by the driving source.

16. A baking device for drying an electrode plate, comprising:
   an oven, wherein an accommodation space configured to dry the electrode plate is provided in the oven; and
   the conveyor according to claim 12, wherein the conveyor is disposed in the accommodation space.

* * * * *